United States Patent [19]

Tracy

[11] Patent Number: 5,548,084
[45] Date of Patent: Aug. 20, 1996

[54] INTEGRATED LIGHT PIPE FOR A SHIELDED HOUSING

[75] Inventor: James L. Tracy, Margate, Fla.

[73] Assignee: Motorola, Inc., Schaumburg, Ill.

[21] Appl. No.: 131,353

[22] Filed: Oct. 4, 1993

[51] Int. Cl.⁶ ....................................................... H05K 9/00
[52] U.S. Cl. ........................... 174/35 R; 174/35 MS File; 361/818; 455/300
[58] Field of Search ................... 174/35 R, 35 MS File, 174/35 GC; 361/816, 818; 455/300, 301

[56] References Cited

U.S. PATENT DOCUMENTS

| | | | |
|---|---|---|---|
| 4,929,062 | 5/1990 | Guzik et al. | 350/245 |
| 5,075,824 | 12/1991 | Tan | 362/31 |
| 5,153,379 | 10/1992 | Guzuk et al. | 174/35 R |
| 5,153,590 | 10/1992 | Charlier | 341/31 |
| 5,177,324 | 1/1993 | Carr et al. | 174/35 R |
| 5,271,056 | 12/1993 | Pesola et al. | 379/58 |
| 5,303,113 | 4/1994 | Goleman et al. | 361/93 |
| 5,355,016 | 10/1994 | Swirbel et al. | 257/659 |
| 5,374,779 | 12/1994 | Konishi | 174/35 R |
| 5,392,145 | 2/1995 | Edwards | 359/67 |
| 5,416,668 | 5/1995 | Benzoni | 361/816 |
| 5,432,626 | 7/1995 | Sasuga et al. | 359/83 |

*Primary Examiner*—Kristine L. Kincaid
*Assistant Examiner*—Christopher Horgan
*Attorney, Agent, or Firm*—R. Louis Breeden

[57] ABSTRACT

An electronic device (10) having a shielded housing (20) with an integrated light pipe (19 & 21) includes a substantially clear housing, a portion of which is arranged and constructed to form the integrated light pipe and plating (23), selectively applied to the substantially clear housing, to provide for effective electromagnetic interference shielding and to allow for sufficient light into the integrated light pipe.

18 Claims, 2 Drawing Sheets

INTEGRATED LIGHT PIPE FOR A SHIELDED HOUSING

TECHNICAL FIELD

This invention relates generally to light pipes and in particular, to a shielded housing having an integrated light pipe.

BACKGROUND

Components in communication equipment are typically sensitive to electromagnetic interference (EMI) and usually require some form of radio frequency (RF) shielding to reduce such interference. Shielding typically involves additional metal "cans" that cover the affected components. Additionally, electronic devices that have displays such as liquid crystal displays (LCDs) require separate light pipes or other means of providing light in conditions of low ambient light or in conditions of no light. The requirement of reducing electromagnetic interference and providing lighting to LCD's, particularly in portable communication products, adds additional parts, cost and labor in a market driven by cost and ease of manufacturability.

Motorola has developed several methods of RF shielding by applying thick film ink to a printed circuit board or substrate as taught by U.S. Pat. No. 5,177,324 by Carr et al. and hereby incorporated by reference. This method and other methods of applying a shield by plating, screen printing, stenciling, spraying, or by other equivalent means prevents the use of a integrated light pipe, since light cannot be reflected through coated shields. Additionally, shields typically used were either metallic or a non-transparent plastic coated with a metal shield. Thus, there exists a need for a shielded housing for electronic devices that would accommodate an integrated light pipe in the shielded housing.

SUMMARY OF THE INVENTION

An aspect of the present invention is an integrated light pipe in a shielded housing, comprising a substantially clear housing, a portion of which is arranged and constructed to form the integrated light pipe. The housing further comprises plating, selectively applied to the substantially clear housing, to provide for effective electromagnetic interference shielding and to allow for sufficient light into the integrated light pipe; and a conductive adhesive about the periphery of a bottom housing surface for mounting the housing on a matching grounded surface of a substrate.

A second aspect of the present invention is an electronic device having a shielded housing with an integrated light pipe comprising a substantially clear housing, a portion of which is arranged and constructed to form the integrated light pipe; and plating, selectively applied to the substantially clear housing, to provide for effective electromagnetic interference shielding and to allow for sufficient light into the integrated light pipe. The electronic device further comprises a substrate comprising a grounded surface that matches the periphery of the bottom housing surface, the substrate positioned below the substantially clear housing; and a conductive adhesive about the periphery of a bottom housing surface for mounting the housing on the matching grounded surface of the substrate.

A third aspect of the present invention is a method for forming an integrated light pipe in a shielded housing for an electronic device. The method comprises the steps of providing a substantially clear housing having an integrated light pipe portion, and selectively applying plating on portions of the substantially clear housing to provide for effective electromagnetic interference shielding and to allow for sufficient light into the integrated light pipe portion. The method further comprises the step of applying a conductive adhesive about the periphery of a bottom housing surface for mounting the housing on a matching grounded surface of a substrate.

DETAILED DESCRIPTION OF THE PREFERRED EMBODIMENT

Figure 1:
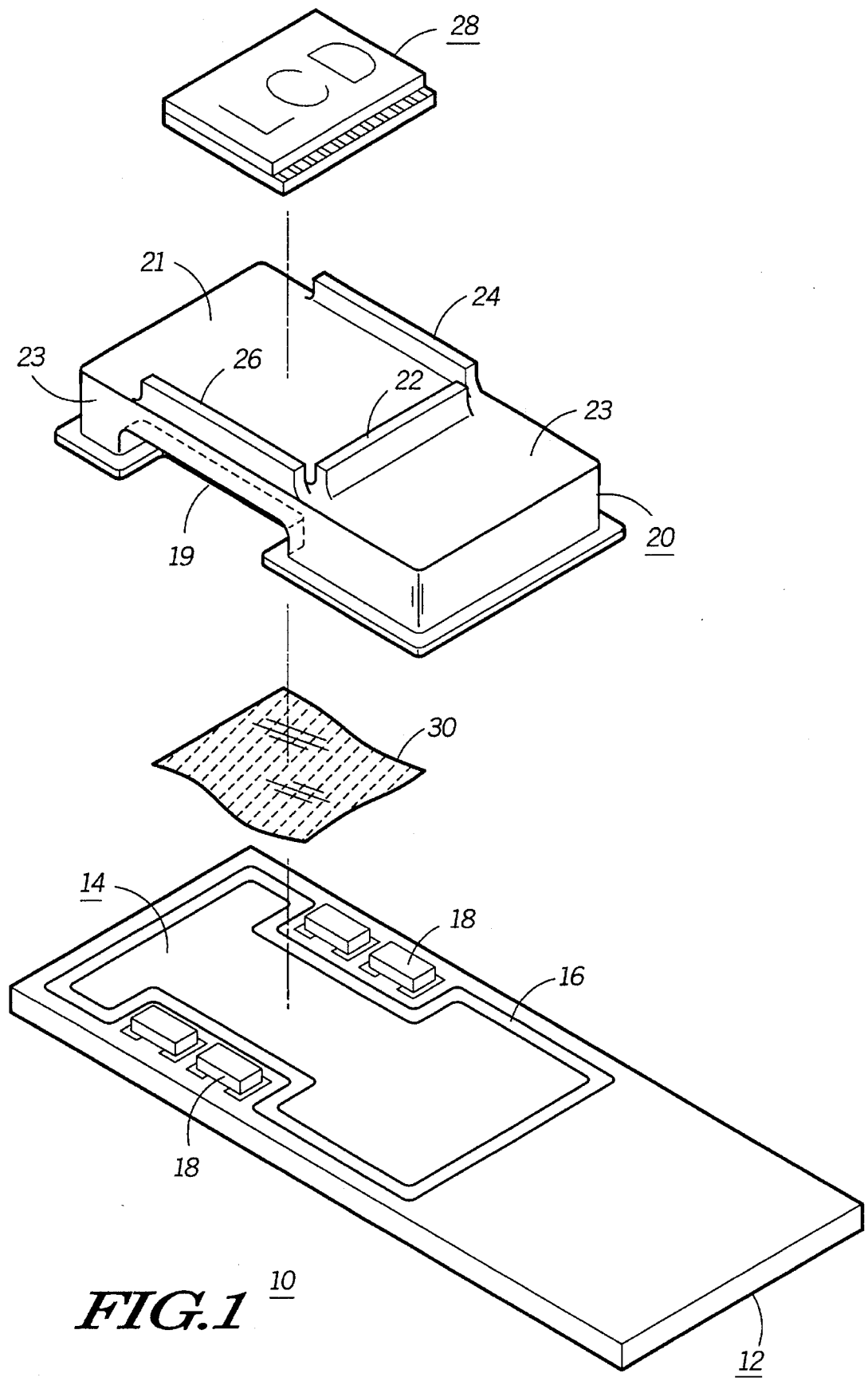
FIG. 1 is an exploded perspective view of an electronic device having an integrated light pipe in a shielded housing in accordance with the present invention.

Referring to FIG. 1, there is shown an electronic device 10 having an integrated light pipe formed in a shielded housing 20 in accordance with the present invention. The housing 20 is preferably made of a clear plastic material, polycarbonate, or acrylic, or other suitable substantially clear material. The electronic device 10 is preferably a portable communication device such as a two-way radio, cellular phone, cordless phone, or pager, although other electronic devices having displays may benefit from the present invention.

In one particular embodiment, an electronic device 10 such as a portable radio may include a printed circuit board or substrate 12 having controller circuitry and radio frequency (RF) circuitry 14 that may require shielding. The printed circuit board 12 may also include other components such as light sources or light emitting diodes (LEDs) 18 that do not require shielding. Typically, a circuit or component requiring shielding would be encased or enclosed by a metal can, but in the present invention, the RF circuitry is enclosed by a substantially clear housing 20 coated or plated selectively in areas 23 or completely internally plated (not shown) with a metallic material such as a silver filled polymer thick film ink or a copper-nickel electroless plate (or other types of plating) that would provide for effective electromagnetic interference shielding and still allow for sufficient light into an integrated light pipe area (19 and 21) in the housing 20 (in locations not plated). Preferably, the housing 20 has mechanical retaining features or stops 24 and 26 for locating and retaining a liquid crystal display 28. The housing 20 may additionally include mechanical light guiding or limiting features 22 to redirect light towards or away from a target area on the liquid crystal display 28 as desired.

As shown, the substantially clear housing 20 should be selectively coated or plated in areas 23 or completely plated internally (shown in FIG. 2) to leave an area for the light pipe. Note that the housing 20 may be coated in the internal portion or underside portion of the housing as well. The light pipe may include the opposing recessed areas 19, the light entrapment area 21, and optionally the light guiding feature or features 22. In assembly, the housing 20 is mounted on the printed circuit board 12 preferably using a conductive adhesive about the periphery of the bottom housing surface. The periphery of the housing is preferably mounted on a matching grounded surface 16 printed on the printed circuit board 12. The housing 20 covers the RF circuit 14 but does not cover the LEDs 18. The LEDs 18 fit external to the housing 20 under the recesses 19. The LCD 28 is then mounted above the light entrapment area 21 of the light pipe. The LCD 28 is retained between the mechanical retaining features 24 and 26. Optionally, a reflective panel 30 can be placed on the underside of the housing 20 corresponding to the light entrapment area. The reflective panel 30 enhances light reflection diffused through the light pipe. The reflective panel 30 is particularly useful in cases where the metal coating (23) is not sufficiently reflective to provide sufficient light through the light pipe. Ideally, the metal coating is sufficiently reflective to eliminate the need for using the reflective panel 30.

In operation, light from the LEDs 18 enters into the (clear) recessed areas 19 of the housing 20 and is diffused through the light entrapment area 21 to provide sufficient back lighting to the LCD 28. The light guide 22 can provide additional lighting as desired. The light then only shines out of the external side of the shield 20 and out of other unplated areas, optimally out of area 21. Light, thus only emits up and out due to the selective surface plating on both internal and external portions of the housing 20.

Figure 2:
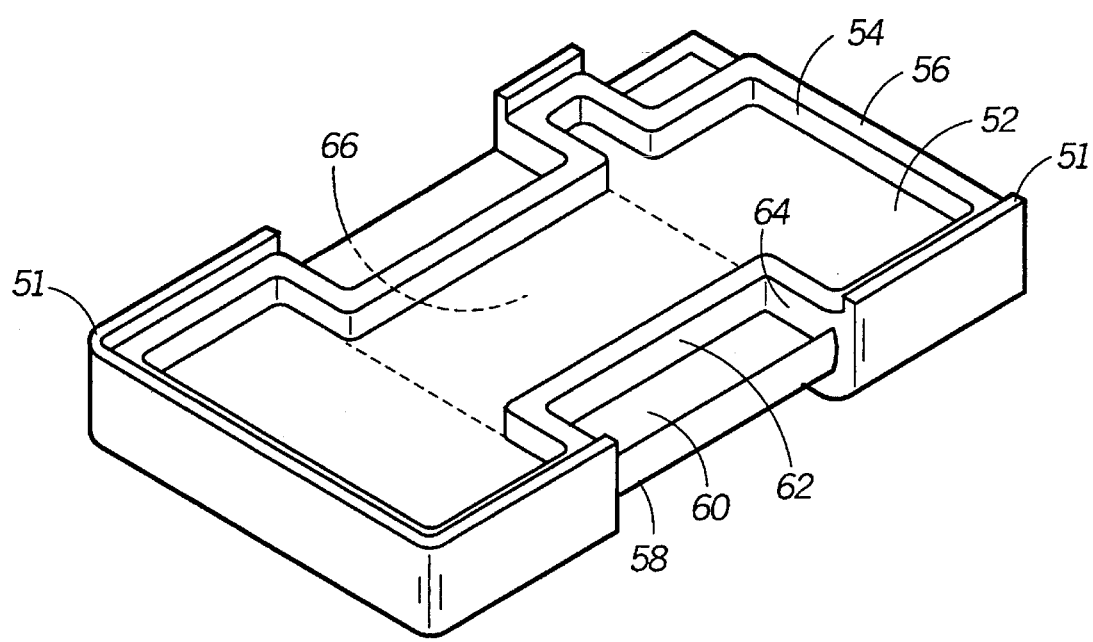
FIG. 2 is a perspective view of an integrated light pipe in a shielded housing in accordance with the present invention.

Referring to FIG. 2, there is shown a Substantially clear housing 50 in accordance with the present invention. The housing is selectively plated or coated with a metallic material in areas 52, 54, and 56. Portions of the housing 50 that do not require plating/coating or are used as part of the light pipe are masked with either tape or chemical resist or other means of masking known in the art on areas 60 (or other areas as noted in the following) where light would enter the housing 50. Optionally, other areas 58, 62, 64, and 66 (where area 66 is similar to the light entrapment area 21 of FIG. 1) can be left unplated (or uncoated) as desired to achieve appropriate back lighting conditions. Additionally, the areas 51, which serves as a locating wall for a substrate (such as the substrate 12 found in FIG. 1), can optionally be plated as well, though it is not required in the present invention. The method of applying the metallic surface can be achieved by sputtering, etching, plating, screen printing or other known methods of applying metal to a substantially clear surface.

In another aspect of the invention, RF circuitry (not shown) can be shielded and mounted on the housing 50 (as taught by U.S. Pat. No. 5,177,324) rather than on a separate printed circuit board. The RF circuitry would be shielded without using a separate housing and the portion of the housing 50 used as a light pipe would be left uncoated or unplated.

The present invention has been described in detail in connection with the disclosed embodiments. These embodiments, however, are merely examples and the invention is not restricted thereto. It will be understood by those skilled in the art that variations and modifications can be made within the scope of the present invention as defined by the appended claims.

What is claimed is:

1. An integrated light pipe in a shielded housing, comprising:

a substantially clear housing, a portion of which is arranged and constructed to form the integrated light pipe;

plating, selectively applied to the substantially clear housing, to provide for effective electromagnetic interference shielding and to allow for sufficient light into the integrated light pipe; and a conductive adhesive about the periphery of a bottom housing surface for mounting the housing on a matching grounded surface of a substrate.

2. The integrated light pipe of claim 1, wherein the substantially clear housing further comprises a pair of recesses without plating on opposing sides of the substantially clear housing for allowing light to diffuse through a light entrapment area.

3. The integrated light pipe of claim 1, wherein the substantially clear housing is formed of a clear polymer.

4. The integrated light pipe of claim 1, wherein the plating is applied to a significant portion of an internal portion of the substantially clear housing.

5. The integrated light pipe of claim 1, wherein the plating is made of an appropriate reflective material.

6. The integrated light pipe of claim 2, wherein a reflective panel is placed on an internal portion of the substantially clear housing and below the light entrapment area to enhance light reflection.

7. An electronic device having a shielded housing with an integrated light pipe, comprising:

a substantially clear housing, a portion of which is arranged and constructed to form the integrated light pipe;

plating, selectively applied to the substantially clear housing, to provide for effective electromagnetic interference shielding and to allow for sufficient light into the integrated light pipe;

a substrate comprising a grounded surface that matches the periphery of a bottom housing surface, the substrate positioned below the substantially clear housing; and a conductive adhesive about the periphery of the bottom housing surface for mounting the housing on the matching grounded surface of the substrate.

8. The electronic device of claim 7, wherein the substantially clear housing is formed of a clear polymer.

9. The electronic device of claim 7, wherein the plating is applied to a substantial portion of an internal portion of the substantially clear housing.

10. The electronic device of claim 7, wherein the electronic device is a portable communication device.

11. The electronic device of claim 10, wherein the portable communication device is a two-way radio.

12. The electronic device of claim 10, wherein the portable communication device is a selective call receiver.

13. The electronic device of claim 7, wherein the plating is made of an appropriate reflective material.

14. The electronic device of claim 7, wherein the electronic device further comprises a liquid crystal display mounted above the light pipe, the liquid crystal display being back-lit by the light pipe when light is diffused through the light pipe.

15. The electronic device of claim 7, wherein the substantially clear housing mounts above a radio frequency circuit on the substrate, thereby providing shielding to the radio frequency circuit.

16. A method for forming an integrated light pipe in a shielded housing for an electronic device comprising the steps of:

providing a substantially clear housing having an integrated light pipe portion; and selectively applying plating on portions of the substantially clear housing to provide for effective electromagnetic interference shielding and to allow for sufficient light into the integrated light pipe portion;

applying a conductive adhesive about the periphery of a bottom housing surface for mounting the housing on a matching grounded surface of a substrate.

17. The method of claim 16, wherein the method includes the step of selectively applying the plating to a substantial portion of an internal portion of the substantially clear housing.

18. The method of claim 16, wherein the method includes the step of selectively applying a sufficiently reflective plating material to the substantially clear housing.

* * * * *